United States Patent [19]
Metz

[11] Patent Number: 5,964,059
[45] Date of Patent: Oct. 12, 1999

[54] SAFETY POLE

[76] Inventor: Donald Metz, 6124 Poolsbrook Rd., Kirkville, N.Y. 13082

[21] Appl. No.: 08/949,406

[22] Filed: Oct. 14, 1997

[51] Int. Cl.$^6$ ........................................................ E01F 13/00
[52] U.S. Cl. ........................................................ 49/49; 404/6
[58] Field of Search .................................. 49/131, 49, 35, 49/25; 404/6, 9, 11

[56] References Cited

U.S. PATENT DOCUMENTS

| | | | |
|---|---|---|---|
| 3,086,430 | 4/1963 | Emmel | 49/49 |
| 3,417,508 | 12/1968 | Sprung | 49/35 |
| 3,698,135 | 10/1972 | Boots et al. | 49/49 |
| 4,576,508 | 3/1986 | Dickinson | 49/49 |
| 4,715,742 | 12/1987 | Dickinson | 49/49 |
| 4,919,563 | 4/1990 | Stice | 49/49 |
| 5,365,694 | 11/1994 | Macaluso | 49/49 |
| 5,425,595 | 6/1995 | Roper | 49/49 |

*Primary Examiner*—Daniel P. Stodola
*Assistant Examiner*—Curtis A. Cohen
*Attorney, Agent, or Firm*—Sughrue, Mion, Zinn, Macpeak & Seas, PLLC

[57] ABSTRACT

A safety pole is comprised of a strip of plastic material having a normal elongated hollow cylindrical condition with overlapping longitudinal edges. A motor driven drum is mounted within a canister adapted to be recessed in the ground in spaced relation to a loading dock with the strip of plastic material connected at one end to the drum whereby the strip of plastic material may be wound on the drum in a flattened condition or extended vertically upwardly to form a pole. A loading dock is provided with a door and the operation of the motor driven drum is coordinated with the operation of the door so that when the door is open, the pole will be in the extended visible condition to warn a truck driven not to approach or leave a loading dock.

6 Claims, 12 Drawing Sheets

FIG. 13
FIG. 14
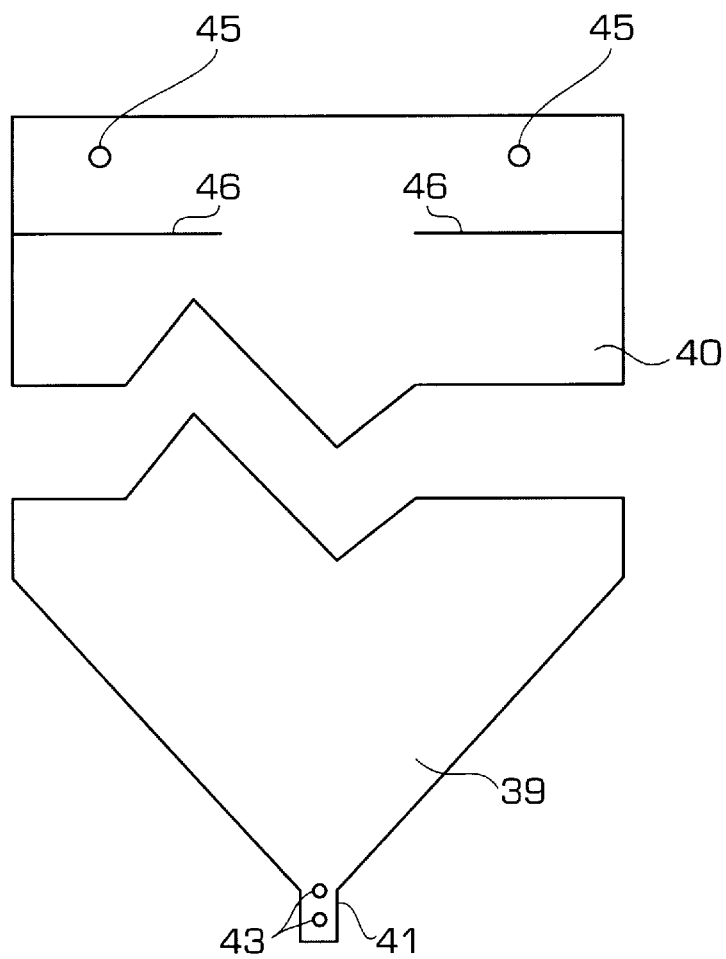
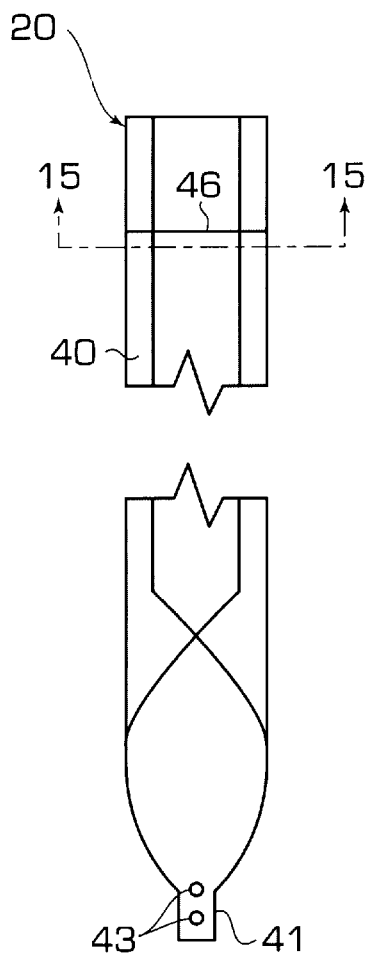
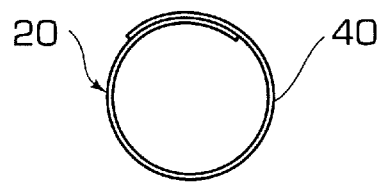
FIG. 15

SAFETY POLE

BACKGROUND OF THE INVENTION

The present invention is directed to a safety pole and more specifically to an extendible and retractable safety pole located in spaced relation to a loading dock to warn truck drivers not to back up to a loading dock or to pull away from a loading dock when the safety pole is in the extended position.

Many mechanical and electrical devices have been produced over the years in an attempt to increase safety at loading dock areas. All of these devices have had significant problems to the extent that the desired safety factor has not been achieved.

The mechanical devices are generally of the type which provide a physical restraint to prevent the truck from pulling away from a loading dock accidently or intentionally while a loading or unloading operation is still being performed. Such mechanical devices however have proven to have high maintenance costs and do not work on all types of trucks. Numerous configurations of mechanical devices have been tried and new ICC bar regulations threaten to complicate the design process of such mechanical restraining devices.

The electrical devices utilized in the past include traffic lights, horns and electric wheel chocks. However, all of these have proved to be inadequate in order to achieve the desired safety factor. The principle difficulty with such electrical devices is that if a truck driver is not aware of the device, he can still pull away from or back into a dock without knowing of any danger.

An extensive review of accident reports at loading docks provided by OSHA and surveys with building owners revealed a surprising statistic. In well over 90% of personal injury cases, the cause of the accident was miscommunication. Frequently a driver did not know that someone was working on a dock or had not finished loading a truck. A further review showed that most of the accidents occurred while backing into the loading dock, not pulling out prematurely.

After review of the statistics and surveys, one common denominator began to appear. It became clear that if some kind of signal device could be provided in front of the loading dock and in front of the truck driver, most of the accidents could be avoided. If you can put some type of physical barrier in the path of a driver, he will not run over it. While several types of existing barriers are known, such as railroad crossing gates or barriers which can be pivoted between a horizontal ground level position and a vertical upstanding position, such barriers generally are unacceptable since the barrier would interfere with truck positioning as well as snow removal on the dock pad. Furthermore, if such rigid devices were accidently hit by the truck, the barrier would be destroyed.

Examples of such barriers are found in the U.S. patents to Quante (U.S. Pat. No. 4,713,910), Fletcher (U.S. Pat. No. 4,901,071) and Caldwell (U.S. Pat. No. 5,146,710). The device in each of these patents is comprised of a pole which can be pivoted from a horizontal ground level position to a vertical position to provide a barrier post for parking lots and passageways. The patent to Quante also discloses an embodiment wherein the pole can be vertically retracted into a hole in the ground. Each of the barrier posts disclosed in these patents would be severely damaged, generally beyond repair, if struck by a vehicle.

SUMMARY OF THE INVENTION

The present invention provides a new and improved safety pole for use in conjunction with loading docks to provide increased safety with respect to truck operations on the dock pad.

The present invention provides a new and improved safety pole comprised of a flat strip of plastic material secured to and wound on a motor driven drum mounted in a canister adapted to be set in the ground in spaced relation to a loading dock and guide means for directing said flat strip of plastic material vertically upwardly upon rotation of said drum in an unwinding direction, said strip of plastic material having a memory whereby upon extension of the strip in the vertical direction, the strip will automatically form into a cylindrical pole to warn a truck driver not to approach or leave a loading dock.

The present invention provides a new and improved safety pole for use in conjunction with a loading dock whereby the safety pole will be automatically extended and retracted when an overhead door on the loading dock is raised and lowered, respectively.

The present invention provides a new and improved safety pole which is substantially indestructible even if the pole is bent or completely knocked down inadvertently by vehicle contact since the pole will be automatically restored to its vertical, cylindrical configuration upon removal of the vehicle due to the inherent memory of the plastic strip.

The above and other objects, features and advantages of the present invention will be more apparent and more readily appreciated from the following detailed description of preferred exemplary embodiment of the present invention, taken in connection with the accompanying drawings.

BRIEF DESCRIPTION OF THE DRAWINGS

FIG. 13 is a plan view of the plastic strip with the center portion broken away, showing the ends of the plastic strip in a flat condition.

FIG. 14 is an elevational view of the safety pole with the center portion broken away, showing the cylindrical configuration of the plastic strip.

FIG. 15 is a sectional view taken along the line 15—15 in FIG. 14.

DETAILED DESCRIPTION OF THE INVENTION

Figure 1:
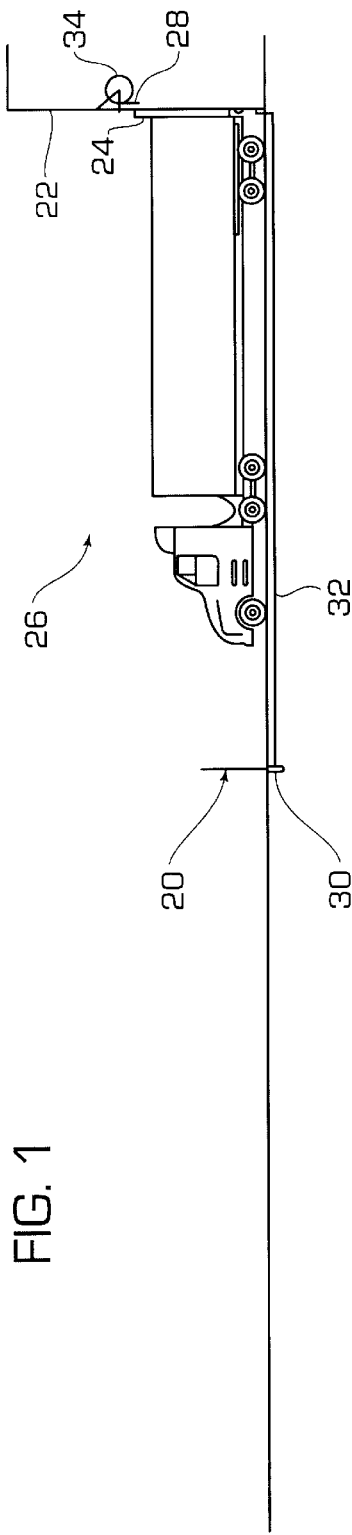
FIG. 1 is a side elevational view showing the relationship of the safety pole, a truck and a loading dock with the truck in contact with the loading dock and the safety pole in the elevated position.

The safety pole 20 according to the present invention is to be used in conjunction with a building 22 having a loading dock 24. The safety pole 20 is spaced from the loading dock 24 approximately 80 feet or a distance sufficient to accommodate the longest tractor trailer unit 26 on the road today. The unit is conventionally backed up to the loading dock 24 and an overhead door 28 is retractably mounted inside the building for opening and closing the loading dock. When the overhead door 28 is in the raised position as shown in FIG. 1, the safety pole 20 will automatically be extended vertically in front of the truck to warn the driver not to pull away from the loading dock since the overhead door 28 is in the raised position.

Figure 2:
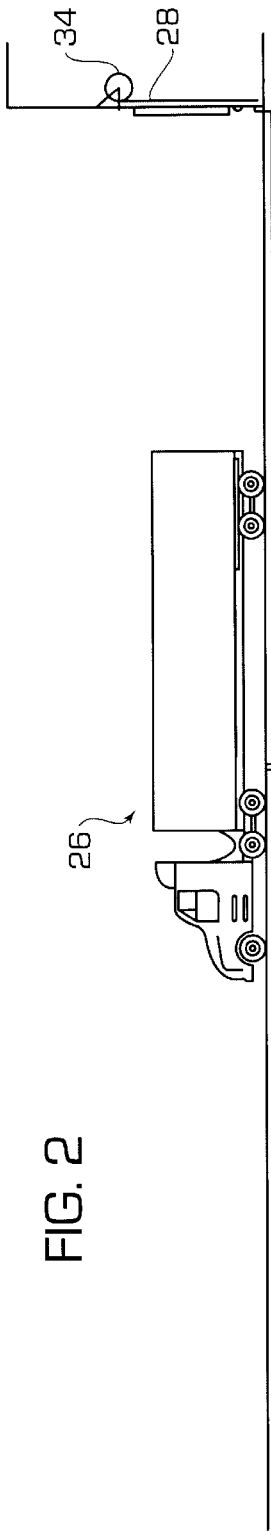
FIG. 2 is a view similar to FIG. 1 showing the truck in transition with the safety pole retracted.
Figure 3:
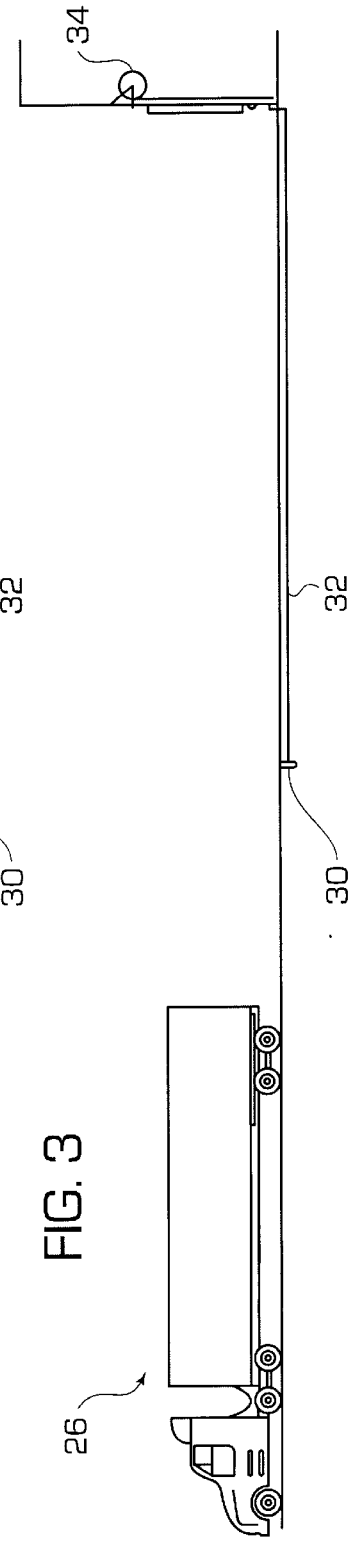
FIG. 3 is a view similar to FIG. 1 with the truck completely out of the loading area and the safety pole in the retracted position.

The safety pole is adapted to be retracted into a canister 30 located below ground level. The pole 20 may be retracted onto a motor driven drum located in the canister. The motor is connected by wires extending through a conduit 32 to the drive unit 34 for raising and lowering the door. Once the loading operation is completed, the door 28 will be lowered and the safety pole 20 will automatically be retracted into the canister 30 as shown in FIGS. 2 and 3. If the overhead door 28 is raised for any reason when a truck is not present at the loading dock, the safety pole 20 will automatically be extended to the position shown in FIG. 1 to warn truck drivers not to approach the loading dock.

The details of the pole and the mechanism for extending and retracting the pole 20 are shown in detail in FIGS. 4–15.

The hollow cylindrical drum 42 is connected to and supported by a pair of drum caps 46 and 48. The drum cap 48 is provided with a hub portion 66 which is rotatably supported in a vertically extending frame member 56 by means of a bearing 68. The output shaft 50 from a gear box 51 connected to the output shaft of an electric motor 52 is secured to the hub 66 by means of a set screw 64 whereby rotation of the output shaft 50 will be imparted to the drum 42. The motor 52 and the gear box 51 are supported by a frame member 53 which in turn is support on a fixed hub 67 and the drum cap 46 of the drum 42 is rotatably supported on the hub 67 by means of a bearing 68. Thus, the motor is contained completely within the drum and is protected from dirt or any other debris which might enter the canister 30.

Figure 12:
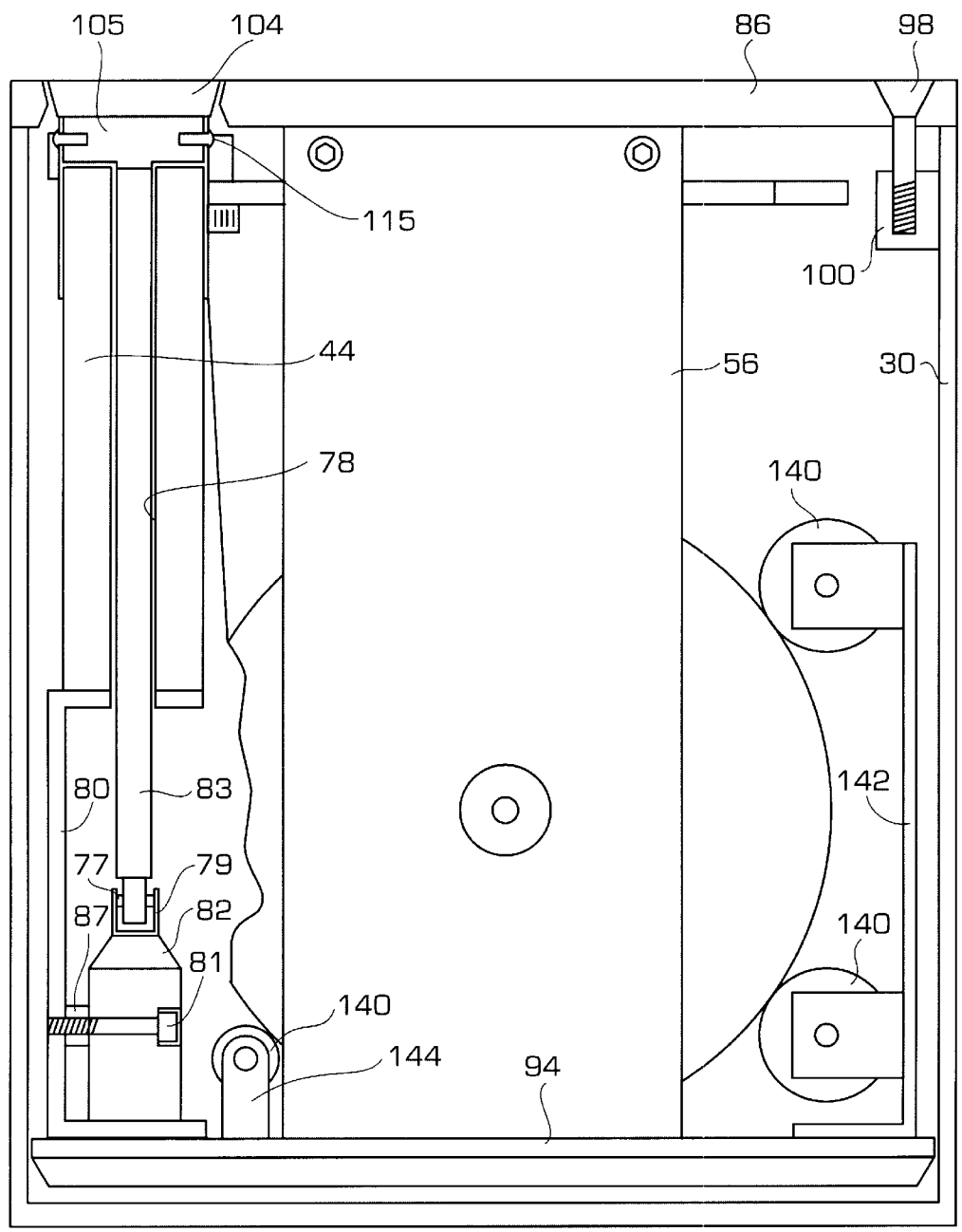
FIG. 12 is a partial sectional view of the canister showing a side elevation view of the internal mechanism in the canister showing different components in section.

The two frame members 56 which support the drum 42 are secured to the ends of a plate 90 secured to the under surface of the top 86 of the canister 30. A base 94 is secured to the frame members 56 by any suitable means and a heating element 92 is secured to the lower surface of the base 94 by any suitable means. The top 86 of the canister is secured to the canister 30 by means of screws 98 which are connected to support brackets 100 secured to the internal surface of the canister 30 adjacent the top edge thereof, as shown in FIG. 12. The canister top 86 is provided with a hole 102 having tapered side walls. A cover 104 having side walls to the sides complimentary to the sides of the hole 102 is provided to close the hole 102. The cover 104 is provided with a downwardly extending cylindrical projection 105. The upper end of a plastic strip 40 which forms the pole 20 is connected to the projection 105, as shown in FIG. 12. With the cover 104 in the closed position, the plastic strip 40 is wound up in flat condition on the drum 42. Since the entire motor driven drum assembly and heating element are mounted from the top 86 of the canister 30, the entire assembly will be suspended above the bottom 106 of the canister 30 so that it will not be sitting in water should any water leak into the canister 30. A suitable drain hole (not shown) may be provided in the bottom wall 106 to drain any water which might enter the canister 30.

Figure 5:
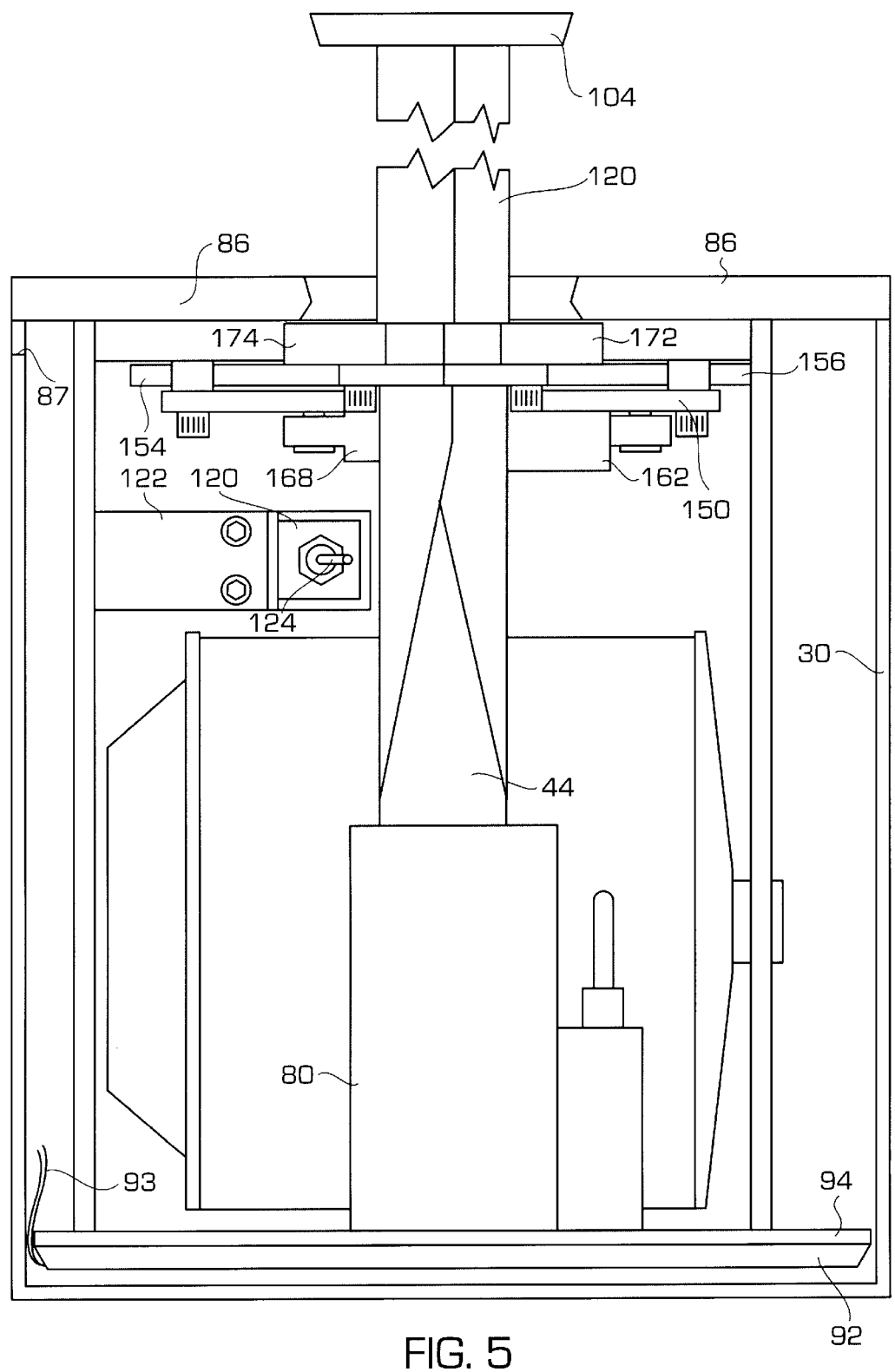
FIG. 5 is a view similar to FIG. 4 with the safety pole in the extended position.

A notch 87 is cut in the top edge of the canister 30 adjacent to the top 86 as shown in FIG. 5 through which the wires 65 for the motor, the wires 93 for the heater and various other wires (not shown) from the switches and solenoids may exit the canister. After the wires are located in the notch 87 the notch may be sealed with an epoxy or other sealer (not shown).

Figure 4:
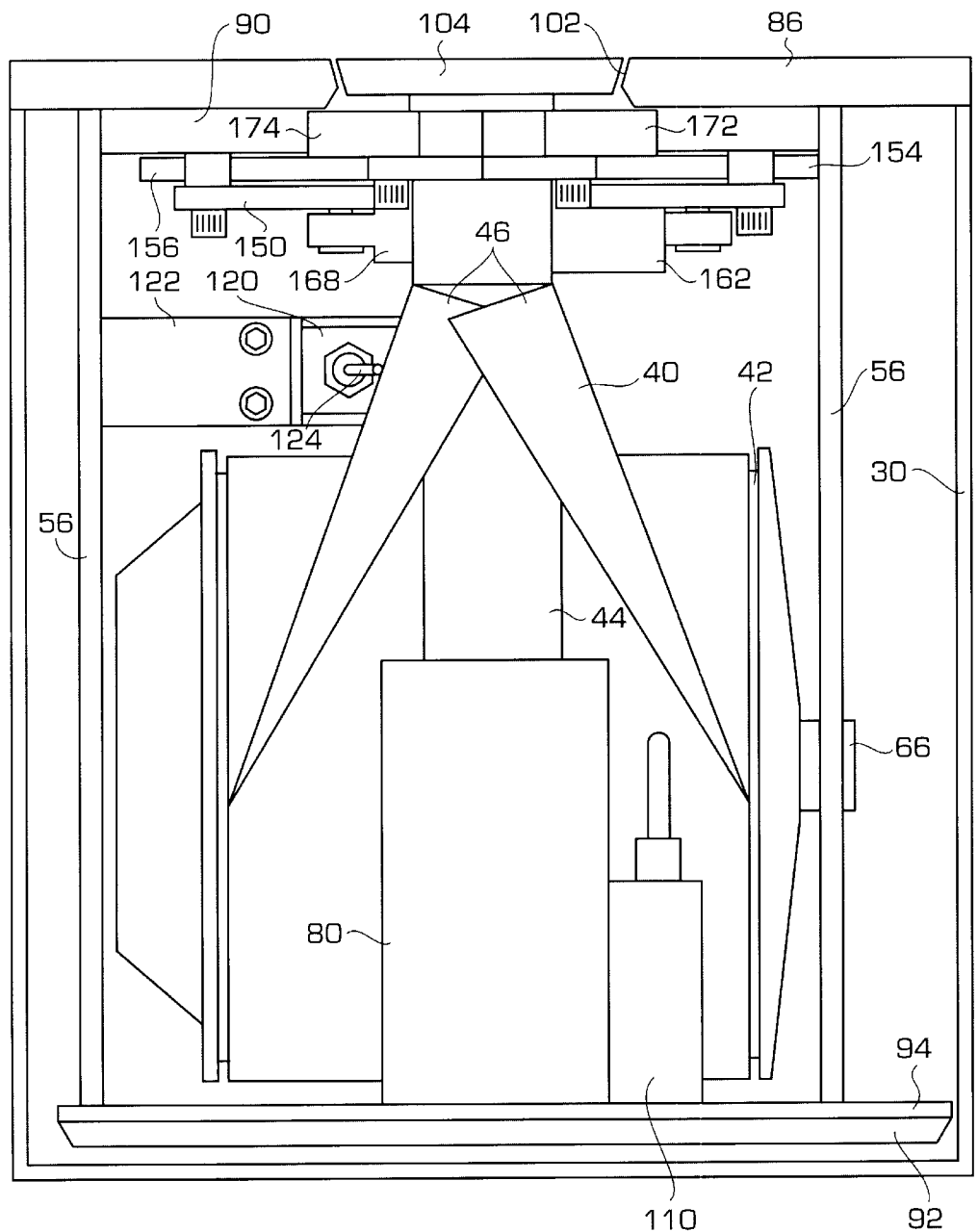
FIG. 4 is a front elevational view of the safety pole in the retracted position within a canister and wound on a motor driven drum rotatably mounted within the canister, the canister being shown in section.
Figure 11:
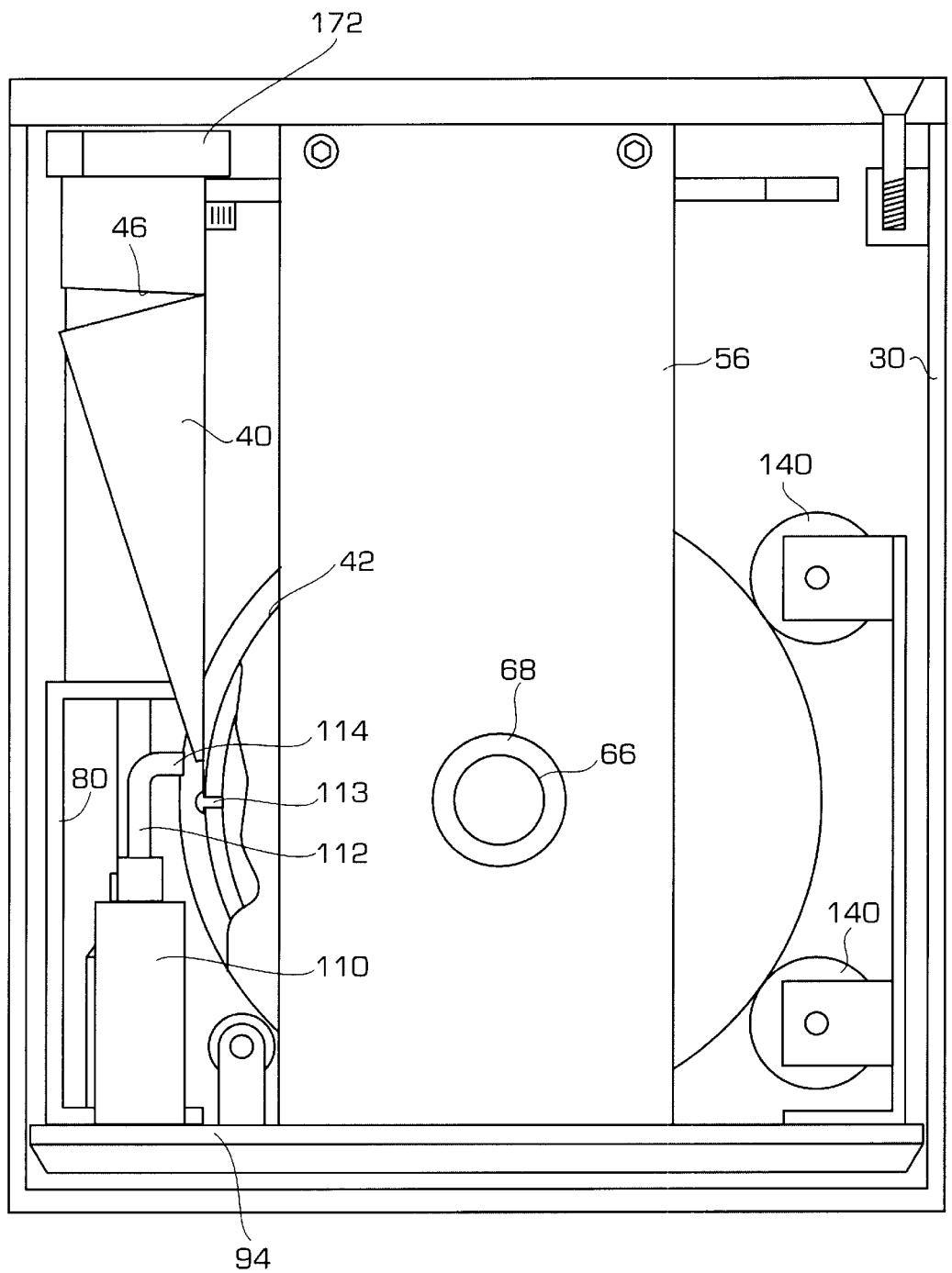
FIG. 11 is a partial sectional view showing a side elevational view of the mechanism within the canister.

The plastic strip 40, which forms the pole 20, is shown in detail in FIGS. 13, 14 and 15. In FIG. 13, the strip 40 is shown in the flat form in which it would be wound on the drum 42. The end 39 of the plastic strip 40 is tapered to form a tab 41 having a pair of apertures 43 extending therethrough. The uppermost end of the plastic strip 40 is squared off and provided with a pair of attachment holes 45. Suitable fasteners 113 (FIG. 11) are provided for securing the tab 41 to the drum 42 through the holes 43. The opposite end of the plastic strip 40 is secured by means of fasteners 115 to the cylindrical extension 105 on the cover 104 as shown in FIG. 12. When the plastic strip 40 is fully retracted on the drum 42 within the canister 30, as shown in FIGS. 4, 11 and 12, the end portion of the plastic strip will remain wrapped about the center guide 44 as shown in FIG. 4.

Since the strip 40 is in transition between a cylindrical configuration at the top end and a seal configuration on the drum 42, a pair of slots 46 are formed in the strip 40 to accommodate the transition. Thus, wedge shaped gaps will appear in the pair of slots 46 as seen in FIGS. 4 and 11.

Figure 8:
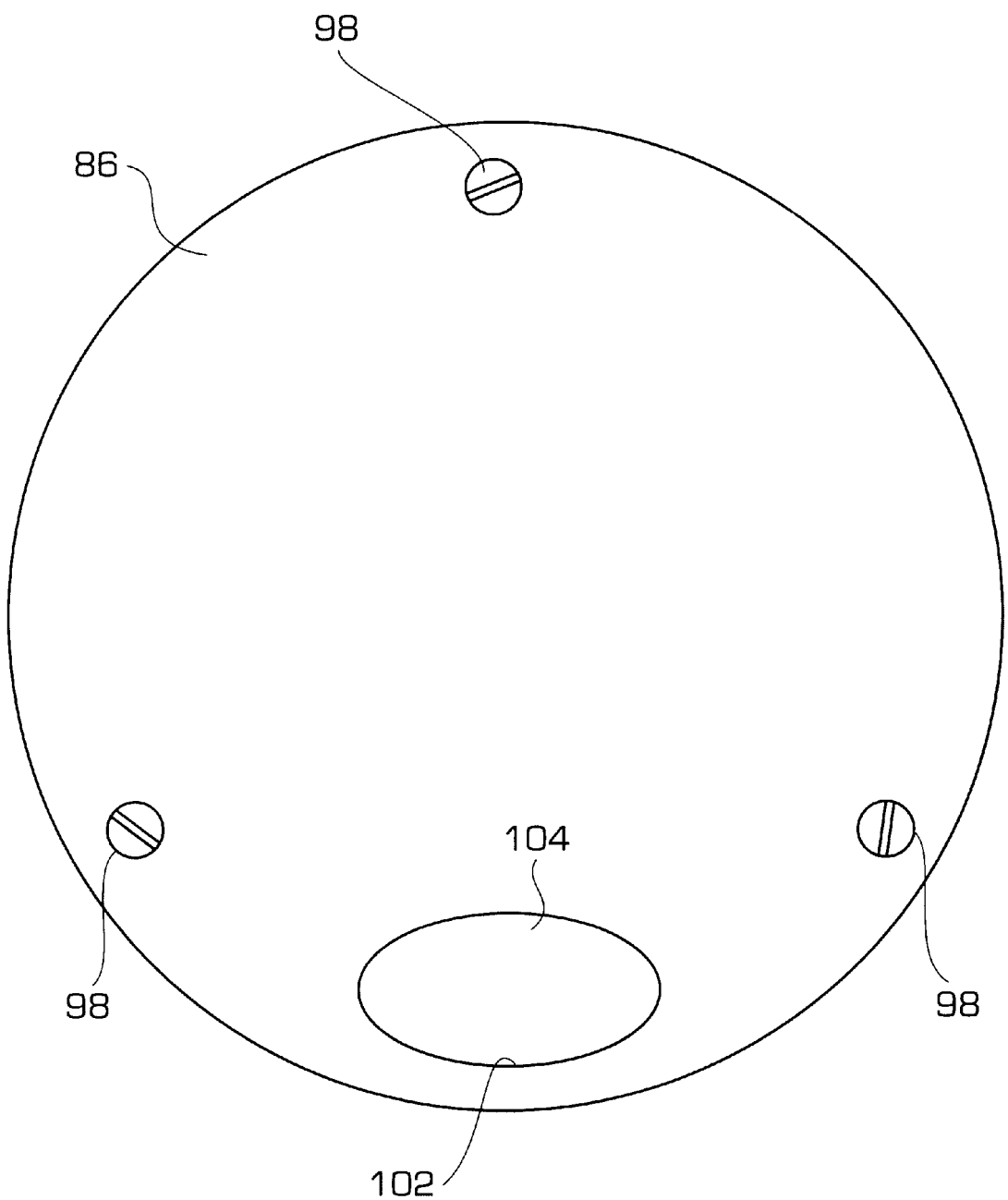
FIG. 8 is a top plan view of the canister with the cover secured thereon.

The plastic strip is extended into the position shown in FIG. 5. The upper end of the plastic strip will extend beyond the top 86 of the canister 30 and the plastic strip will assume a tubular configuration as best seen in FIG. 14. With the strip 40 fully extended, the tab will still be secured to the drum as shown in FIG. 11. Due to the fact that the plastic strip 40 initially has a somewhat oval configuration as it is being formed into a cylindrical tube about the center guide element 44, a hole 102 in the cover 104 have a substantially oval configuration, as best seen in FIG. 8.

The center guide 44, about which the plastic strip 40 is formed, is provided with a hollow center portion 78 as shown in FIG. 12 and the guide element 44 is mounted on a C-shaped bracket 80, which in turn, is mounted on the bottom plate 94. A limit switch 82 is mounted on the C-shaped bracket 80 and is secured thereto by means of a bolt 81. An actuator rod 83 for the limit switch 82 is operatively connected to a plunger 79 by means of a cross pin 77 and extends upwardly through the bore 78 in the guide element 44. The upper end of the actuator rod 83 is spring biased upwardly by means of a spring (not shown) within limit switch 82 which engages the plunger to move it upwardly to terminate slightly above the upper end of the guide element 44 when the pole is in the raised position. Upon lowering the pole, the cover 104 will seat in the aperture 102 and the projection 105 will engage the actuator rod 83 and move it downwardly to actuate the limit switch 82.

An additionally safety limit switch 110 is mounted on the base member 94 adjacent the limit switch 82. A bent actuator rod 112 is pivotably mounted in the switch 110 with the end 114 disposed in proximity to the surface of the drum, as shown in FIG. 11. If, upon raising of the pole, the cover 104 engages an obstacle to stop the raising of the pole, the continuous running of the motor will cause the plastic film 40 wound on the drum 42 to bulge outwardly from the surface of the drum, whereupon the plastic film 40 will engage the end 114 of the actuator rod 112 to proof the rod and operate the limit switch 110 to shut off the motor.

A further limit switch 120 is mounted on a bracket 122, which in turn is mounted on the frame member 56, as best seen in FIG. 4. The limit switch 120 is provided with a pivoted feeler 124, the end of which is disposed in engagement with the plastic film 40 when it is in the transition stage from the flat coiled condition to the extended tubular condition as best seen in FIG. 4. Once the plastic strip 40 is fully extended into the hollow tubular pole form, the plastic strip will no longer engage the feeler 124, as shown in FIG. 5, whereby the feeler 124 will be pivoted to a position to actuate the switch 120 and shut off the motor 52.

Three guide rollers, 140 are located adjacent the periphery of the drum 42 at angularly spaced positions, as shown in FIG. 12. Two of the rollers 140 are mounted on the base 94 by means of a support bracket 142 and the third roller 140 is mounted on the base member 94 by means of a support bracket 144. The purpose of the guide rollers 140 is to prevent the plastic film 40 from uncoiling outwardly in a spiral manner should the raising of the pole be impeded by any obstacle. This will then force the plastic film into engagement with the operating member 112 of the limit switch 110.

Figure 9:
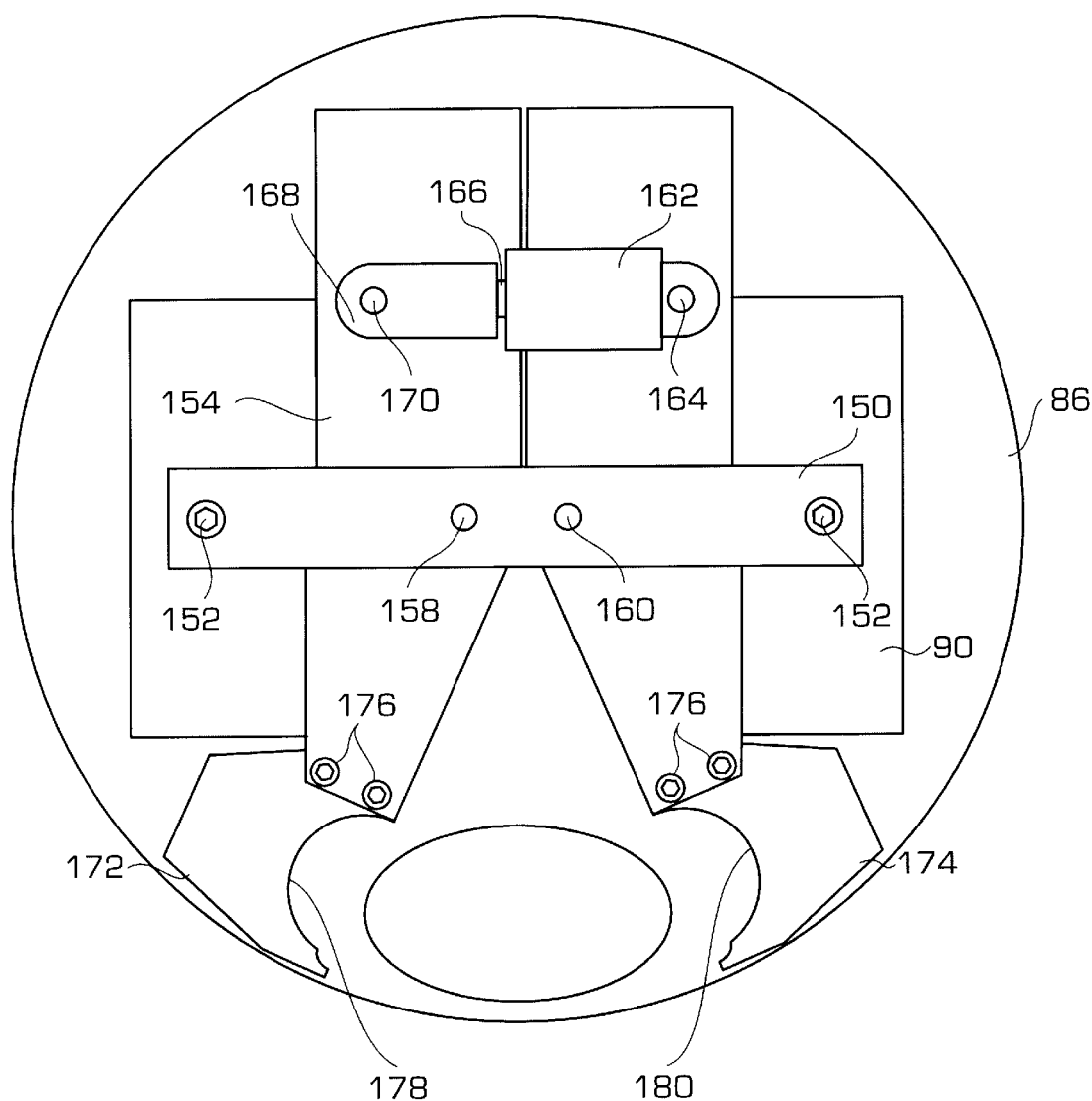
FIG. 9 is a sectional view, taken along the line 9—9 of FIG. 4 showing the pole clamping mechanism with the clamp in the open condition.
Figure 10:
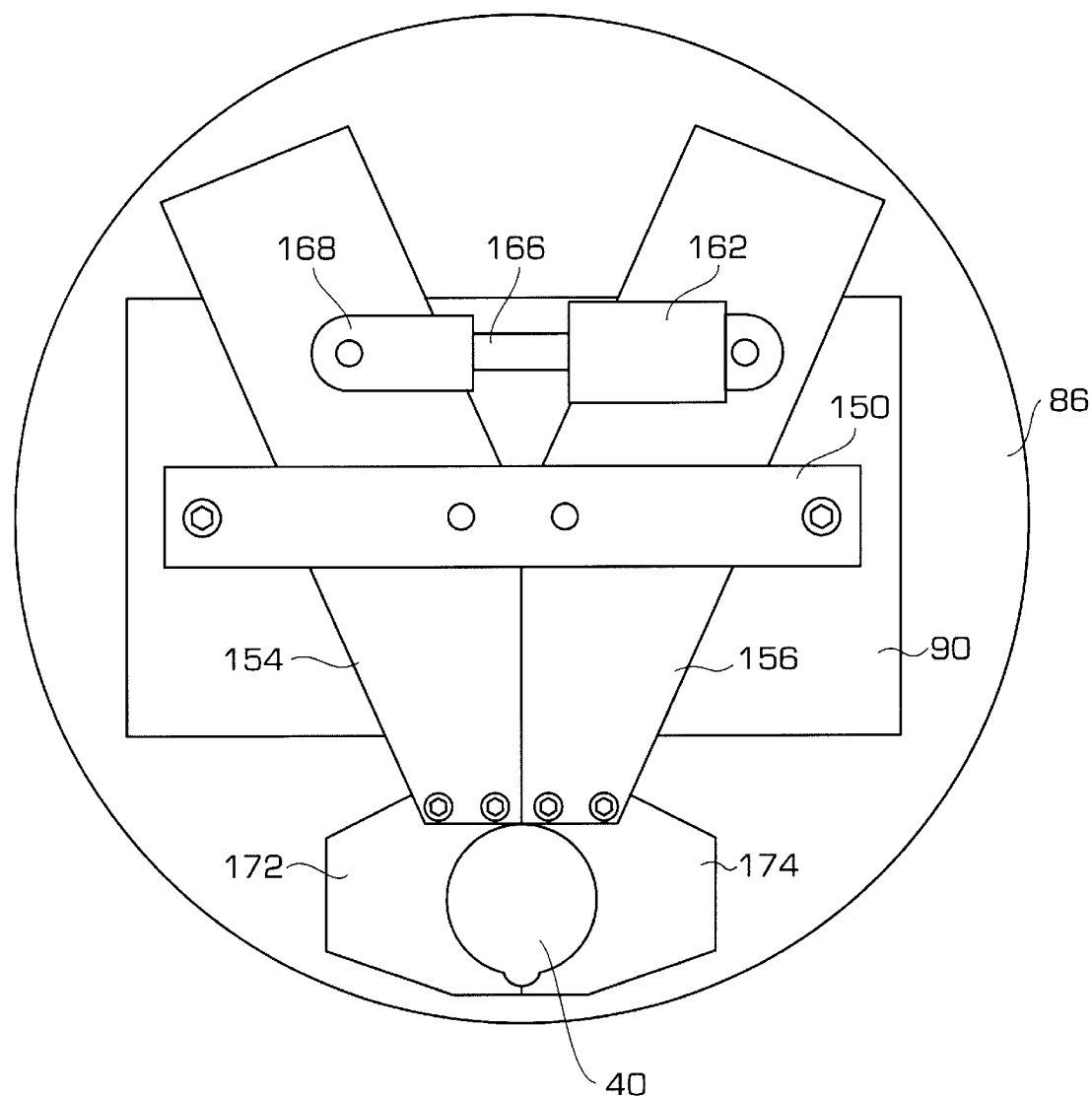
FIG. 10 is a sectional view similar to FIG. 9 with the pole clamping mechanism with the clamp in the clamped condition.

A clamping arrangement for clamping the hollow tubular pole 20 against the cylindrical projection 105 on the under side of the cover 104 is shown in FIGS. 4, 5, 9 and 10. As best seen in FIGS. 9 and 10, a support strap 150 is secured to the underside of the support plate 90 which in turn is secured to the underside of the cover 86 for the canister. The strap 150 is secured to the plate 90 by means of a pair of bolts 152 and a pair of clamp supporting arms 154 and 156 are pivotally mounted between the strap 150 and the support plate 90 on pivot pins 158 and 160, respectively. A solenoid 162 is mounted on the underside of the clamp supporting arm 156 on a pivot pin 164. The armature 166 of the solenoid is connected to a bracket 168 which in turn is pivoted at 170 to the other clamp supporting arm 154. A pair of clamp members 172 and 174 are secured to the ends of the clamp supporting arms 154 and 156, respectively, by means of bolts 176. Each of the clamps 172 and 174 have semicircular clamping surfaces 178 and 180, respectively which are adapted to engage and clamp the plastic film 40 against the center guide element 44 when the post 20 is in the fully raised position. The clamps 172 and 174 act as shields to close the hole 102 in the top 86 of the canister 30 when the post 20 is extended to prevent the entry of foreign matter into the canister. When it is desired to lower the post, the solenoid is energized to pivot the arms 154 and 156 and move the clamp members 172 and 174 to the unclamped positions as shown in FIG. 9.

While the invention has been particularly shown and described with reference to preferred embodiments thereof, it will be understood by those in the art that the foregoing and other changes in form and details may be made therein without departing from the spirit and scope of the invention.

While the invention has been disclosed as a safety pole for use with a loading dock with the purpose of warning truck drivers not to back-up to or pull away from a loading dock when the pull is in the extended position the safety pole can obviously be used in a number of other situations. A plurality of safety poles could be provided as lane markers in a roadway or parking lot which may be extended or tracked to vary the configuration of the lanes. Also, the safety pole could be used to prevent the unauthorized use of a parking place in a parking garage or a parking lot, wherein an authorized person for the particular parking space would be provided with a coded control for operating the motor similar to a garage door opener remote control.

While the strip 40 has been referred to as a plastic strip, it is obvious that other type of material having a memory could be used instead of plastic. For example, steel strips can be provided with a curved configuration and the longitudinal direction of the strip in the relax condition but, which would still enable the strip to rolled up in a flat condition.

Figure 6:
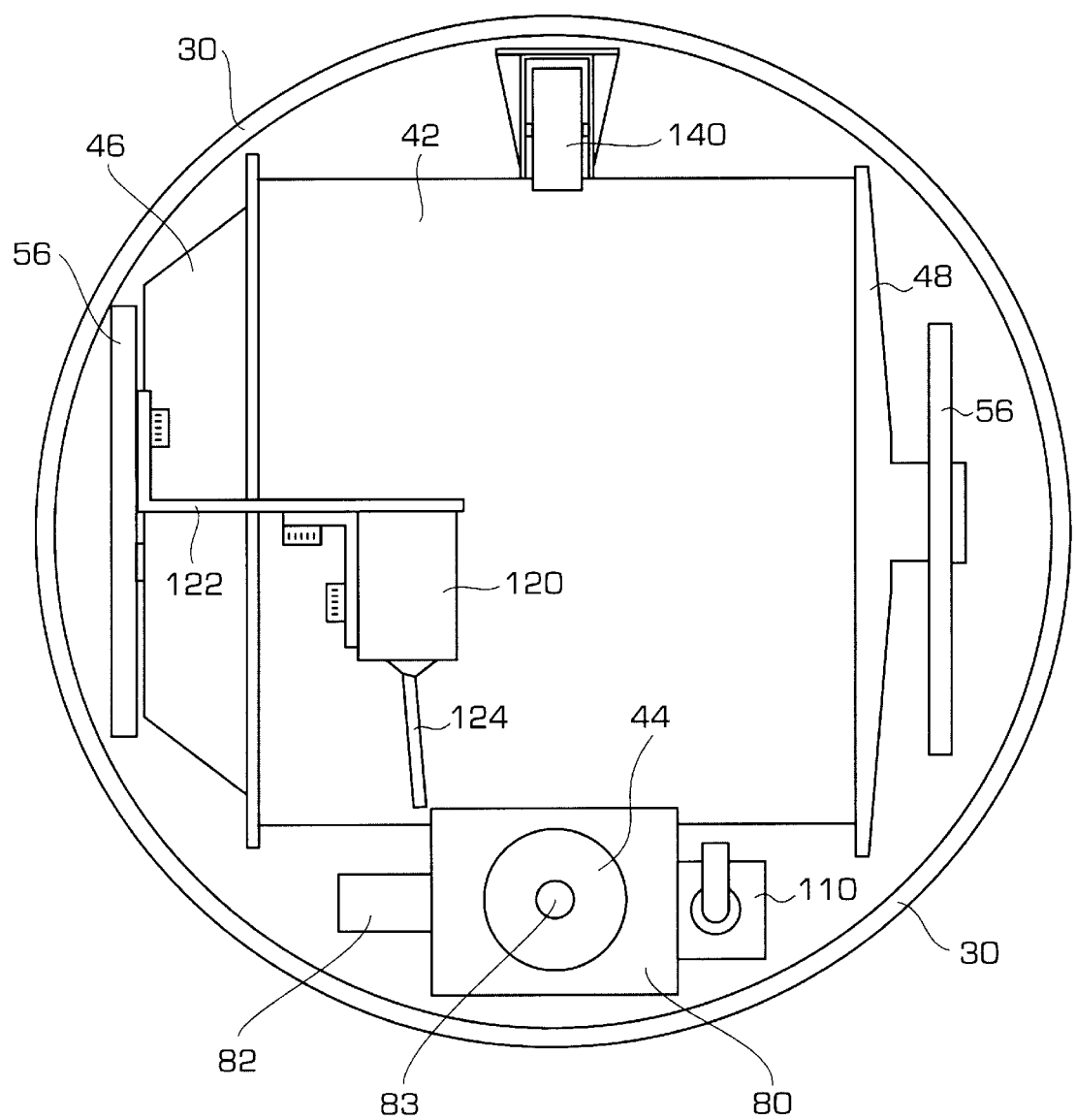
FIG. 6 is a sectional view taken on the line 6—6 in FIG. 4.
Figure 7:
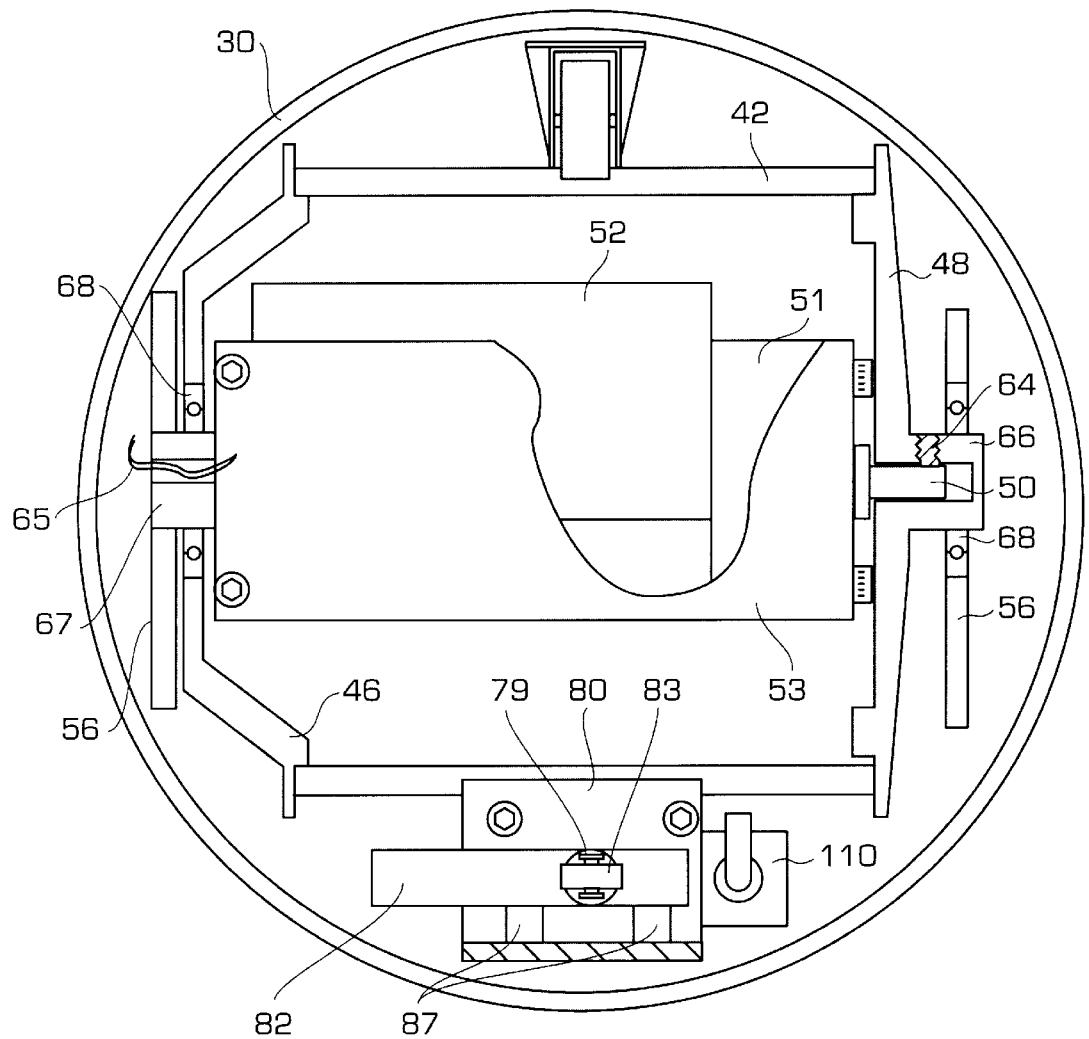
FIG. 7 is a sectional view taken along the line 7—7 in FIG. 4.

FIG. 6 shows the control circuitry for the motor and the clamping arms associated with the extended pole retraceable pull described above. The motor 52 is a reversible motor and the main motor control is the switch SW1. This switch can be operated in conjunction with the overhead door on a loading dock as described in the example above. The switch SW1 can be operated with conjunction with the operation of the overhead door 28, so upon operation of the motor 34 to raise the overhead door 28, the switch SW1 would automatically be moved to initiate raising of the pull. However, it is obvious that the switch SW1 could be controlled by any other arrangement and is not in anyway limited to the operation of the overhead door of a loading dock.

Figure 16:
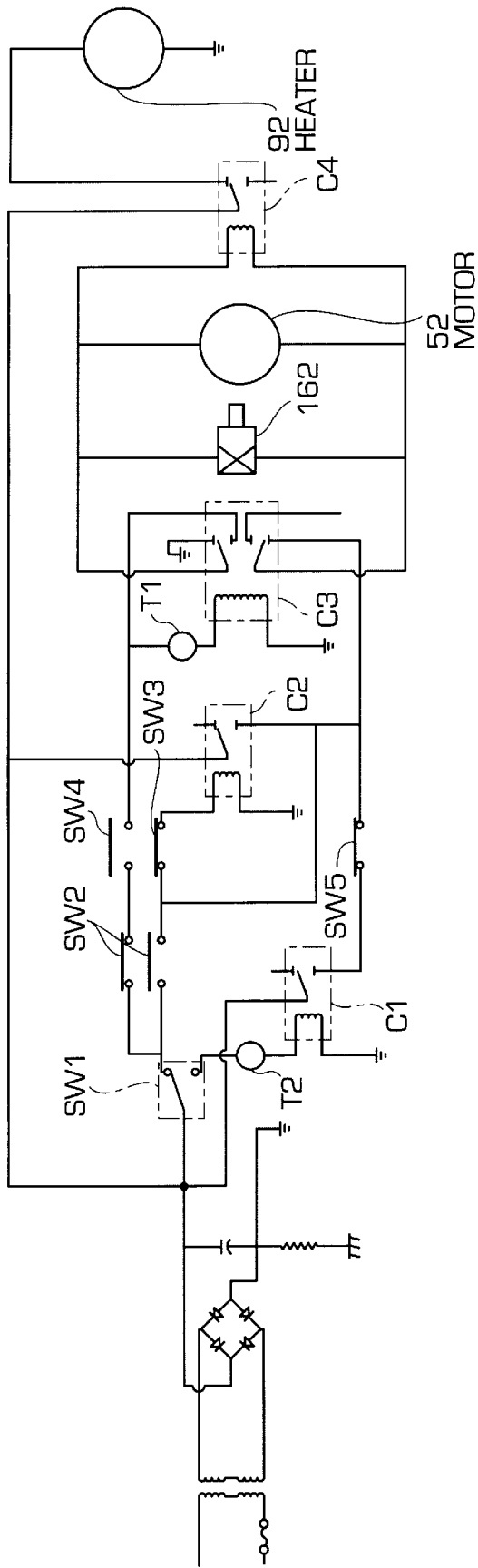
FIG. 16 is a schematic view of the circuitry for controlling the raising and lowering of the safety pole.

Upon moving the switch SW1 to the close position as shown in FIG. 16, the power will be supplied through normally closed switch SW2 and normally open switch SW4 which is held in the close position by the pull material when the hole is down and the material is wrapped on the drum. The power will then be supplied to the timer and after a twenty second delay the relay C3 will be operated to supply current to the motor 52 to unwind strip 40 into the raised position to form a pull. The pull will continue up until the switch SW4 opens.

When the switch SW1 is opened, that is moved to the position opposite to that shown in FIG. 16, power will be supplied to the timer T2 and after a twenty second delay the relay C1 will be energized to move the switch therein to supply power to the motor 52 for rotation in the opposite direction to retrace the pull and wind the strip 40 on the drum. The pull will continue down until the switch SW5 is opened. The timer T2 is provided so that if there is a failure in the switch SW5 or a pull problem after twenty seconds, the motor will shout off and a suitable warning light can be provided to indicate a problem.

If the pull is activated to move into the up position and meet an optical, the pull material will buckle causing the normally open switch SW2 to close thereby supplying power to the relay C2 which will then supply power to the motor 52 to operate in the direction to retrace the pull. When the pull is fully wind on the drum normally closed switch SW3 will open stopping the motor. If switch SW1 is still closed, that is in the door open condition, the time T1 will not allow the pull to go back up for twenty seconds.

The solenoid 162 for operating the clamps 172 and 174 is wired in conjunction with the motor 52, so that any time there is power supply to the motor in the up or down condition, the solenoid 162 will be opened to move the clamps 172 and 174 to the open non-clamping position.

What is claimed is:

1. A safety pole comprised of a flat strip of plastic material secured to and wound on a motor driven drum mounted in a canister adapted to be set in the ground and guide means in said canister for directing said flat strip of material vertically upwardly upon rotation of said drum in an unwinding direction, said strip of plastic material having a shape memory whereby upon extension of the strip in the vertical direction, the strip will automatically form into a cylindrically-shaped pole extending above the ground.

2. A safety pole as set forth in claim 1, further comprising pressing means engaging said strip of material on said drum to maintain said strip of material in the flat condition when wound on said drum.

3. A safety pole as set forth in claim 1, wherein said canister is provided with a detachable top adapted to be flush with the ground and having a hole therein to permit passage of said strip of material therethrough and cover means secured to one end of said strip of plastic material for engaging said top and closing said hole upon winding of said strip of material onto said drum.

4. A safety pole as set forth in claim 3, further comprising mounting means secured to said cover for suspending a frame within said canister in spaced relation to a bottom of said canister and support means for rotatably supporting said drum in said frame.

5. A safety pole as set forth in claim 4, wherein said drum has a hollow configuration with a motor mounted within said frame.

6. A safety pole as set forth in claim 5, further comprising heating means secured to said frame to prevent icing of said given drum and strip of plastic material in cold weather.

\* \* \* \* \*